March 10, 1925.
C. L. RAYFIELD
THERMOSTATIC VALVE
Filed Feb. 6, 1919
1,528,788
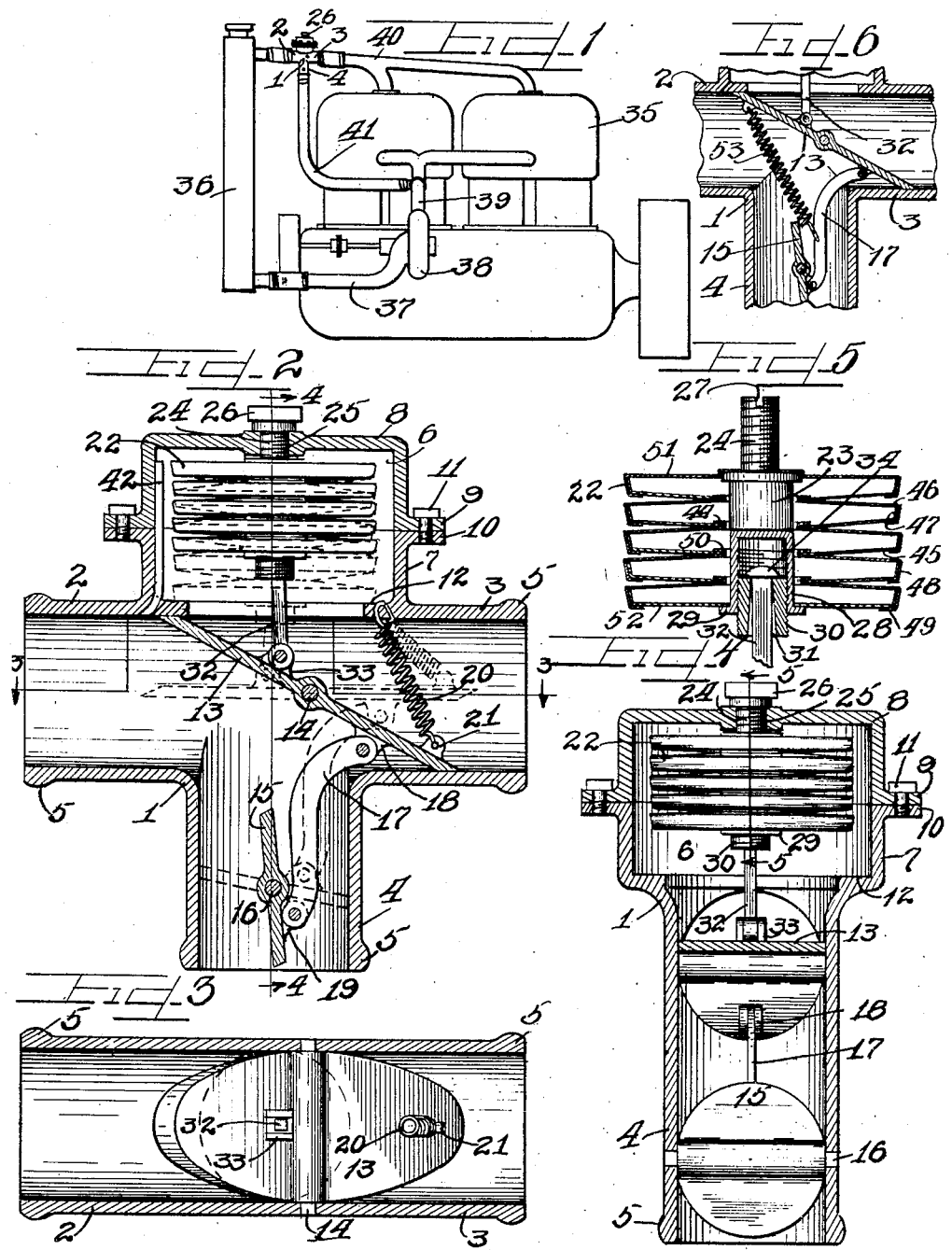

Patented Mar. 10, 1925.

1,528,788

UNITED STATES PATENT OFFICE.

CHARLES L. RAYFIELD, OF CHICAGO, ILLINOIS, ASSIGNOR TO BENEKE MANUFACTURING COMPANY, OF CHICAGO, ILLINOIS, A CORPORATION OF ILLINOIS.

THERMOSTATIC VALVE.

Application filed February 6, 1919. Serial No. 275,407.

*To all whom it may concern:*

Be it known that I, CHARLES L. RAYFIELD, a citizen of the United States, and a resident of the city of Chicago, in the county of Cook and State of Illinois, have invented certain new and useful Improvements in a Thermostatic Valve; and I do hereby declare that the following is a full, clear, and exact description of the same, reference being had to the accompanying drawings, and to the numerals of reference marked thereon, which form a part of this specification.

This invention has reference more particularly to a valved fitting which is thermostatically operated and is particularly adaptable for use in engine temperature regulating systems for effecting a rapid heating of the cooling fluid around the engine cylinder and maintaining the cooling fluid uniformly at a certain temperature.

In internal combustion engines, there is a certain temperature of the cylinders, which varies somewhat in the various types of such engines, at which the engine develops the greatest efficiency and gives the best results. It is customary to provide a system for applying a cooling fluid to the cylinders to prevent excessive heating thereof, but as this system must be adapted to serve its purpose under extreme conditions such as in very hot weather, it results that under ordinary conditions its cooling capability is in excess of the needs of the engine and the cylinders are cooled below the temperature for the most efficient operation, and furthermore in starting the engine, when cold, it takes a considerable period of time to warm the engine cylinders up to a satisfactory working temperature and there is a consequent period of erratic and uncertain operation.

It is an object of my invention to provide an improved valved fitting which is thermostatically controlled and particularly adapted to be connected with the cooling system of an internal combustion engine so as to automatically regulate the supply of cooling fluid to the engine cylinders and thereby enable the cylinders to be quickly heated when starting the engine and maintain the cylinders during operation of the engine, at the temperature at which the engine develops its greatest efficiency.

Another object of my invention is to provide a valve for regulating the supply of cooling fluid to the cylinders and a thermostat for controlling the operation of said valve, said valve being adapted in case the controlling ability of the thermostat is impaired, to permit sufficient cooling fluid to be supplied to the cylinders to prevent excessive heating thereof.

Another object of the invention is to provide a fitting with a thermostatically controlled valve which is of simple compact construction and in which the parts are easily accessible for repairs or adjustments.

Another object of the invention is to provide a compact thermostatic element which can be easily and economically manufactured, and which is securely reinforced at the joints.

Another object of the invention is to provide a valve controlling thermostat which is adapted to be separated from the main fluid passageway when the temperature reaches a predetermined point and thereby prevent excessive heating or strain to the thermostat.

Another object of the invention is to provide a fitting with a thermostatically operated valve wherein the opening of the valve is effected quickly and with a small degree of movement.

Another object of my invention is to provide a valve with a thermostatic controlling element, wherein the valve and thermostatic element are adjustably connected so that the operation of the valve by the thermostat may be regulated.

Another object of the invention is to provide a valve and thermostatic element for operating the valve with a pivotal connection therebetween to permit free movement of the valve without strain upon the thermostat.

Another object of my invention is to provide a fitting with a valve and a thermostat for operating the valve, and a connection therebetween which may be adjusted from the exterior of the fitting to change the relative position of the thermostat and valve for regulating the operation of the valve by the thermostat.

Another object of my invention is to provide a fitting with a valved passageway and a thermostat chamber with a duct from the passageway to the remote portion of the thermostat chamber adapted to provide circulation whereby a uniform temperature is maintained throughout the entire thermostat chamber.

My invention also has other important objects which will appear from the following specification and the accompanying drawings, in which a preferred form of my invention is illustrated and described.

On the drawings:

Figure 1 is a side view of an automobile or other similar engine having my thermostatic valve fitting connected in the circulating system.

Figure 2 is an enlarged vertical longitudinal sectional view through the fitting.

Figure 3 is a sectional view on the line 3—3 of Figure 2.

Figure 4 is a sectional view on the line 4—4 of Figure 2, with the parts thereof shown in elevation.

Figure 5 is a sectional view through the thermostatic element on the line 5—5 of Figure 4.

Figure 6 is a fragmentary sectional view of a fitting illustrating a modified form of detail.

As shown on the drawings:

The fitting or casing is indicated generally at 1, and has the opposite aligning apertured branches 2 and 3, and the intermediate branch 4, each of which is adapted to have connections made therewith, and in the present instance are provided for this purpose with heads 5, at the outer end thereof over which a hose is adapted to be telescoped and clamped thereon as shown in Figure 1. At the top of the fitting, opposite the branch 4, is a thermostat chamber 6, which is formed partially by a cylindrical wall 7, at the top of the fitting 1, and partially by a cap 8, which has a flange 9, extending around the edge thereof and secured to the flange 10, at the upper edge of the wall 7, by means of the cap screws 11, and there is an opening from the thermostat chamber 6, to the interior of the fitting 1, which opening is surrounded by a ledge 12, which serves to provide a stop against which the thermostat seats when expanded as hereinafter noted.

An elliptical valve 13, is horizontally pivoted at its minor axis in the fitting 1, intermediate of the branches 2 and 3, so as to close diagonally as shown in Figure 2, and interrupt communication between the branch 3, and the other two branches 2 and 4, and at the same time interrupt communication between the thermostat chamber 6, and the latter branches, and permits communication between the thermostat chamber 6, and the branch 3, at all times. There is also a valve 15, in the branch 4, which is also slightly elliptical in form and pivoted as at 16, at its minor axis so as to close diagonally somewhat as shown by the dotted lines in Figure 2, and this valve is connected to operate with the valve 13, by means of a lever 17, which is bent or angularly formed so as to clear the wall of the fitting. The upper end of the lever is pivoted to lugs 18, on the under face of the valve 13, and the lower end thereof is pivoted to the lugs 19, on the upper face of the valve 15, so that when the valve 13 is closed, the valve 15, will be opened and when the valve 13, is opened the valve 15, will be closed. A spring 20, has one end connected to the wall of the fitting and the other end to the lug 21, on the upper face of the valve 13, so as to normally hold the valve 13, open, and require closing of the valve against the tension of the spring.

For automatically operating the valve 13, there is a thermostat 22, which is mounted in the chamber 6, and connected with the valve 13, so as to open and close the valve 13, and 15, proportionately to the temperature of the fluid applied to the thermostat.

This thermostat 22, as shown in Figure 5, consists of a series of hollow disks which communicate with one another through openings 44, at the centers thereof, and contain some fluid, which expands sufficiently at the temperature desired to be maintained, to develop a pressure within the thermostat and expand each hollow disk axially to provide movement for operating the valve 5.

This thermostat element 22, is constructed of pairs of ring shaped disks 45 and 46, the former of which has an axially extending flange 47, at the outer edge thereof for spacing the adjoining disks 45 and 46, and the latter of which has the flange 48, extending axially in the opposite direction, and telescoping the flange 47, and has the edge 49, thereof, turned inwardly so as to clamp the disks 45, and 46, together. For securing the inner edges of the adjoining disks 46 and 47 together, the inner edge of the disk 46, is swaged axially and outwardly as at 50, so as to embrace the inner edge of the disk 45, and clamp the inner edges of the two disks together. This provides a secure joint for connecting the disks of the thermostat and the joints may also be soldered or otherwise sealed.

The upper and lower end walls or disks 51 and 52, respectively, are attached to the end disks 45 and 46, respectively, by means of flanges 47 and 48, in the same manner as the disks 45 and 46, are connected together, and the upper end wall 51, has the plug 23, secured axially to the inside thereof by soldering or otherwise, and extending inwardly through the openings 44, to afford a stop to limit the contraction of the thermostat.

This plug 23, has a threaded stem 24, which projects axially and outwardly and is passed loosely through a central opening 25, in the cap 8, of the thermostat chamber, and has the nut 26, threaded on the outer end thereof against the outer face of the cap 8, to hold the thermostat in position. The outer end of the stem 24, is provided with a notch 27, to be engaged by a screw driver or may have any other suitable wrench connection whereby, after loosening the nut 26, the thermostat may be turned to provide adjustment hereinafter described.

The lower disk 52, of the thermostat is provided with a hollow internally threaded sleeve 28, which has the flange 29, at the lower end securely fastened to said lower disk and has the upper end closed and adapted to engage the inner end of the plug 23, to limit the contraction of the thermostat, and there is a plug 30, which has a threaded connection with the interior of the sleeve 28, whereby said plug may be adjusted lengthwise of the sleeve. This plug 30, has a rectangular opening 31, extending axially therethrough to engage a rectangular stem 32, which is pivoted at its lower end to lugs 33, on the upper face of the valve 13, and has the head 34, at the upper end which engages the upper face of the plug 30, to provide a loose link for exerting a pull on the valve. The slot 31, is preferably tapered downwardly or flared in one direction as shown in Figure 5, to permit swinging of the stem therein, and engages the stem so as to be held thereby from turning and therefore when the thermostat 22, is rotated the plug 30, is held from turning and is withdrawn from the sleeve 28, or inserted a further distance therein by reason of its threaded engagement therewith and adjustment is thereby effected for regulating the opening and closing of the valve 13. This adjustment, it will be noted, can be made from the exterior of the fitting by merely loosening the nut 26, and turning the thermostat by means of a screw driver inserted in the notch 27, or by any other connection that may be provided, and after such adjustment the nut 26, is turned down tight against the cover 8, and holds the thermostat in the adjusted position.

This thermostat fiting is adapted to be placed in the circulating system with which internal combustion engines are usually provided for cooling the engine and serves to quickly raise the temperature of the cooling fluid around the engine cylinder to the desired working temperature, and also automatically maintains the temperature around the cylinder at this point.

In the application of my fitting as shown in Figure 1, the numeral 35 indicates an internal combustion engine which may be of any form and 36, a radiator, the lower portion of which is connected by means of the pipe 37, to the inlet side of a pump 38, the outlet pipe 39, from which is connected near the bottom of the engine cylinder jackets. A manifold conduit 40, is connected with the cylinder jackets at the top and leads to the top of the radiator 36, and I have shown my fitting interposed between the manifold 40, and the top of the radiator. This fitting has the branch 3, thereof connected with the manifold 40, and the opposite branch 2, is connected with the top of the radiator so that the valve 13, operates to control communication from the top of the cylinder jackets to the top of the radiator. There is also a by-pass pipe 41, from the outlet pipe 39, of the pump 38, connected with the branch 4, of the fitting, and the arrangement of the valves 13 and 15 is such that when the valve 13 is closed and prevents communication between the cylinder jackets and the radiator, the valve 15, is open and permits the water from the pump to pass through the pipe 41, to the radiator, and thereby enables circulation to be maintained in the radiator.

The valve 13, is normally closed when the engine is started and remains closed until the temperature of the water in the cylinder jacket is raised sufficiently to expand the thermostat 22, in the thermostat chamber, said chamber being at such time in communication with the branch 3, connected with the top of the cylinder jacket. In order to provide circulation in the thermostatic chamber 6, and insure uniform distribution of the heated water throughout the chamber 6, to properly energize the thermostat 22, I have provided a pipe 42, the lower end of which is in communication with the branch 2, and the upper end of which is adjacent the top of the thermostatic chamber 6, so that a limited circulation of water is maintained from the branch 3, to the top of the thermostat chamber, and to the branch 2 when the valve 13 is closed.

When the temperature in the thermostat chamber 6, reaches the point at which the thermostat 22, is adapted to operate, the thermostat expands and opens the valve 13, so as to automatically maintain the water in the cylinder jackets at the desired temperature. The connection of the thermostat with the valve may be adjusted by means of the notch 27 in the stem so as to vary the operation of the valve 13, and may thus be regulated to maintain the water at the temperature at which the engine develops its greatest efficiency.

Obviously, as the valve 13, is opened, the valve 15, closes correspondingly and the water from the pump is thus caused to pass more or less through the cylinder jackets according to the amount of opening of the valve 13, and the closing of the valve 15, and when the valve 13, is entirely open the entire output of water from the pump 38, is required to pass through the cylinder jackets.

In order to prevent excessive heating and undue strain on the thermostat 22, in case the temperature of the water in the cylinder jacket should be raised to an abnormal degree, the thermostat is arranged so that when it is extended, the lower disk thereof will seat against the ledge 12, around the opening into the thermostat chamber 6, so as to interrupt communication to the thermostat chamber 6, and prevent exposure of the thermostat to excessive temperatures. This arrangement also serves to provide a stop to prevent movement of the valve 13, by the thermostat beyond the open position.

The thermostat 22, is preferably made of soft metal such as copper or annealed brass, rather than spring metal, the soft metal being more desirable as it lends itself better to the construction of the thermostatic element. The air is exhausted from the interior of the thermostat to such an extent that it is normally collapsed and the sleeve 28, abuts against the plug 23, and holds the valve 13, closed against the tension of the spring 20, and suitable fluid is provided in the thermostat, which at the temperature at which the valve is desired to be opend, expands and permits the spring 20, to pull the valve 13, open to a greater or less extent depending on the degree of expansion of the fluid in the thermostat.

Inasmuch as the extension of the thermostatic element is effected by the tension of the spring 20, and not by the force of the expansion of the fluid in the thermostatic element, a sensitive structure is provided which will yield not only proportionately to the decrease in vacuity in the thermostatic element but the operation is also governed by the tension of the spring used therewith. Moreover, the thermostatic element is not subjected to as great an operating pressure as is required when the element is operated by internal pressure alone or when it operates against the tension of a spring, as in many structures in which thermostatically controlled valves are provided, and there is consequently less danger of the pressure being increased sufficiently to strain or break the walls of the thermostatic element. Therefore, in my construction, the thermostatic element is not only protected from excessive heating by the seating of the lower disk against the ledge 12, which isolates the chamber containing the thermostat from the passages of the valve casing, but it would also require a considerable increase in temperature thereafter to develop a pressure in the thermostat sufficient to strain or endanger the walls thereof.

In a device of this character which is designed to normally close the valve thereof and prevent circulation, it is advisable that in case of failure of the thermostat to function properly, the valve may be arranged to open so as to prevent overheating of the engine. To this end the illustrated device is, as above noted, preferably made with soft metal walls and collapsed by exhausting the air therefrom and provided with a spring acting against the thermostat to open the valve so that in case the thermostate is impaired as for instance by puncture, the walls of the thermostat will readily yield and permit the spring 20, to move the valve to the open position.

The structure shown in Figure 6, which is in other respects similar to the device of the preceding figures, has a spring 53, connecting the lever 17, and the outer end of the valve 13, and which acts similarly to the spring 20, of the other structure to exert a tension to open the valve 13, and close the valve 15.

The operation is as follows:

When the engine is started and the temperature of the cooling fluid is lower than the temperature that is desired to be maintained in the cylinder jacket, the valves 13 and 15 will occupy the position shown in Figure 2, and prevent discharge of water from the water jacket of the engine and at the same time will permit the pump 38, to circulate the water through the pipe 41, and the open valve 15, and back through radiator, which circulation through the radiator is of benefit, as it permits normal operation of the pump, maintains the water inactive in the cylinder jacket and permits more rapid heating thereof, and also in cold weather prevents freezing of the radiator. Due to the small amount of water contained in the cylinder jacket and its incapability of circulation when the valve 13, is closed, this water soon becomes heated to a high degree and the heat therefrom is communicated by reason of the circulation permitted through the pipe 42, to the chamber 7, of the thermostat. When the temperature in the chamber 7, reaches the degree at which the thermostat 22, is designed to operate, the hollow disks thereof, will expand and open the valve 13, and close the valve 15, so as to retard circulation in the pipe 3, and permit circulation through the cylinder jacket, and when the entire volume of water has become heated to some extent, and the engine is running, so as to heat the water in the cylinder jacket sufficiently to maintain the water in the thermostatic chamber 7 at the desired temperature, the valve 13, will remain open, and the valve 15, closed, so that the entire circulation takes place in the cylinder jacket. If, however, the amount of heat given off by the engine is diminished and the temperature of the water reduced, the thermostat will automatically close the valve 13, sufficiently and open the valve 15, a corresponding amount so as to limit the circulation in the cylinder jacket and prevent cooling below the desired temperature, and by this means, the water in the cylinder jacket is constantly maintained at the temperature desired. When the temperature has reached the point to fully open the valve 13, the lower disk of the thermostat will be seated against the flange 34, so as to close communication between the inlet 2, and the chamber 7, and any temperature in the inlet 2, above the temperature necessary to entirely open the valve 13, will not be communicated to the chamber 7, by reason of this closure, and the thermostat 10, is thereby prevented from excessive expansion and undue strain.

While I have shown my invention in a certain form, I am aware that various changes and modifications may be made without departing from the principles of my invention, and I therefore do not purpose limiting the patent granted hereon otherwise than necessitated by the prior art.

I claim as my invention:

1. The combination of a casing having an inlet and an outlet and a valve therebetween, a thermostat at the inlet side of and connected with the valve for controlling the operation thereof, a by-pass inlet having a valve operable within the aforesaid valve so as to afford communication from the by-pass inlet to said outlet when the first mentioned valve is closed and means extending to the upper portion of the casing for affording limited circulation around the thermostat when said first mentioned valve is closed.

2. In a device of the class described the combination of a radiator, an engine water jacket, an upper conduit connecting the top of the water jacket and the top of the radiator, an inlet pipe connecting the bottom of the water jacket and the bottom of the radiator, a by-pass conduit connecting the upper conduit and the inlet pipe, a main valve in the upper conduit operable by a thermostat to interrupt communication from the top of the water jacket and to the radiator and by-pass, and an auxiliary valve for the by-pass adapted to open when the main valve closes.

3. In a device of the class described the combination of a radiator, an engine water jacket, an upper conduit connecting the top of the water jacket and the top of the radiator, an inlet pipe connecting the bottom of the water jacket and the bottom of the radiator, a pump in the inlet pipe, a by-pass conduit connecting the pump outlet with the upper conduit, a thermostatically operated valve in the upper conduit for interrupting communication from the top of the water jacket to the top of the radiator, and an auxiliary valve for the by-pass adapted to open when the main valve closes.

4. A thermostatic valve fitting having an aperture therethrough with an inlet and an outlet, and a thermostat chamber at the side thereof having a thermostatically controlled opening to the aperture, a valve intermediate of the inlet and outlet, a spring connected with the said valve and exerting a tension to open the valve, and a thermostat in the said thermostat chamber for controlling the operation of the said valve.

5. The combination with a casing having apertured branches connected therewith, of a valve in the aperture, a thermostat in the casing for operating the valve and means in the casing for limiting the movement of the thermostat and preventing damage thereto due to excessively high temperatures.

6. The combination with a casing having apertured branches connected therewith, of a valve in the aperture, a vessel in the casing adapted to expand and contract with changes of temperature, spring controlled operating means connecting the vessel with the valve, and a flange at the junction of the passageway and casing whereby the expansion of the vessel is limited and the entrance to the casing closed when the limit of expansion is reached and said vessel engages the flange.

7. In a thermostatic valve fitting the combination of a pivoted valve, a thermostat, a link pivoted to the valve, a member loosely connected therewith and having a threaded engagement with one end of the thermostat, supporting means at the other end of the thermostat adapted to permit rotation of the thermostat to vary the connection of the threaded member with the other end of the thermostat to regulate the operation of the valve.

8. In a thermostatic valve fitting the combination of the valve, a thermostat having a threaded sleeve at one end and a supporting member at the other end extending outside the fitting and having external means for adjusting the thermostat circularly, a threaded plug engaging the threaded sleeve, a rectangular opening in the plug, and a rectangular stem slidingly engaging the square socket and having the other end thereof pivoted to the valve.

9. In a thermostatic valve fitting the combination of a pivoted valve, a spring exerting a tension to open the valve, a thermostat, a link pivotally connected with the valve and having a sliding connection with one end of the thermostat, and supporting means at the other end of the thermostat.

10. In a thermostatic valve fitting the combination of a valve, a rotatable thermostat, a member having a threaded engagement with one end of the thermostat, a link pivotally connected with the valve and having a sliding relation with the said member and provided with suitable means to hold the link and threaded member from relative rotary movement, so as to hold the member from rotation with the thermostat.

11. In a thermostatic valve fitting having a passageway and a thermostat chamber at one side of the passageway, the combination of a valve in the passageway adapted to interrupt communication between the thermostat chamber and one end of the passageway, and a circulation duct communicating with said end of the passageway and terminating adjacent the outer wall in the upper portion of the thermostatic chamber.

12. In a thermostatic valve fitting having a passageway and a thermostat chamber extending laterally from and communicating with the passageway, the combination of a thermostatically operated valve in the passageway adapted to interrupt communication between said chamber and one end of the passageway, and a circulation duct communicating with said end of the passageway beyond the valve, and extending outwardly from the passageway to a remote portion of the thermostat chamber so as to maintain circulation in the thermostat chamber when the valve is closed.

In testimony whereof I have hereunto subscribed my name in the presence of two subscribing witnesses.

CHARLES L. RAYFIELD.

Witnesses:
 EARL M. HARDINE,
 CHARLES W. HILLS, Jr.